July 3, 1962 W. C. LAMAR 3,042,445
COMBINATION GLARE SHIELD AND SHADE DEVICE
Filed June 30, 1960 2 Sheets-Sheet 1
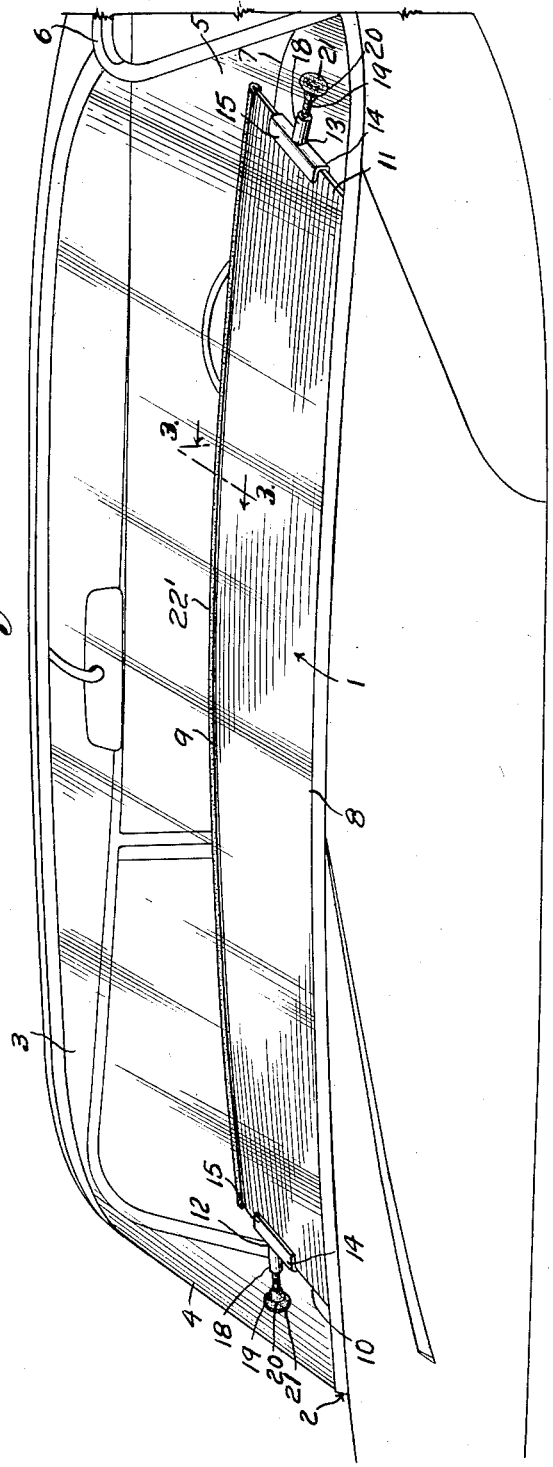
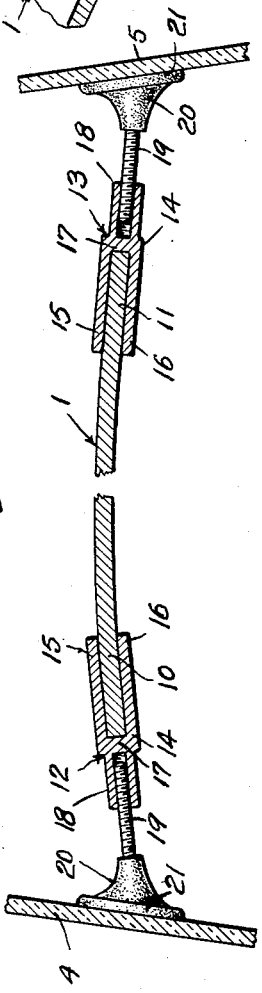
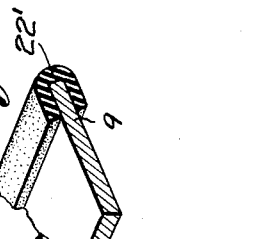
INVENTOR.
William C. Lamar
BY
Paul E. Mullendore
ATTORNEY

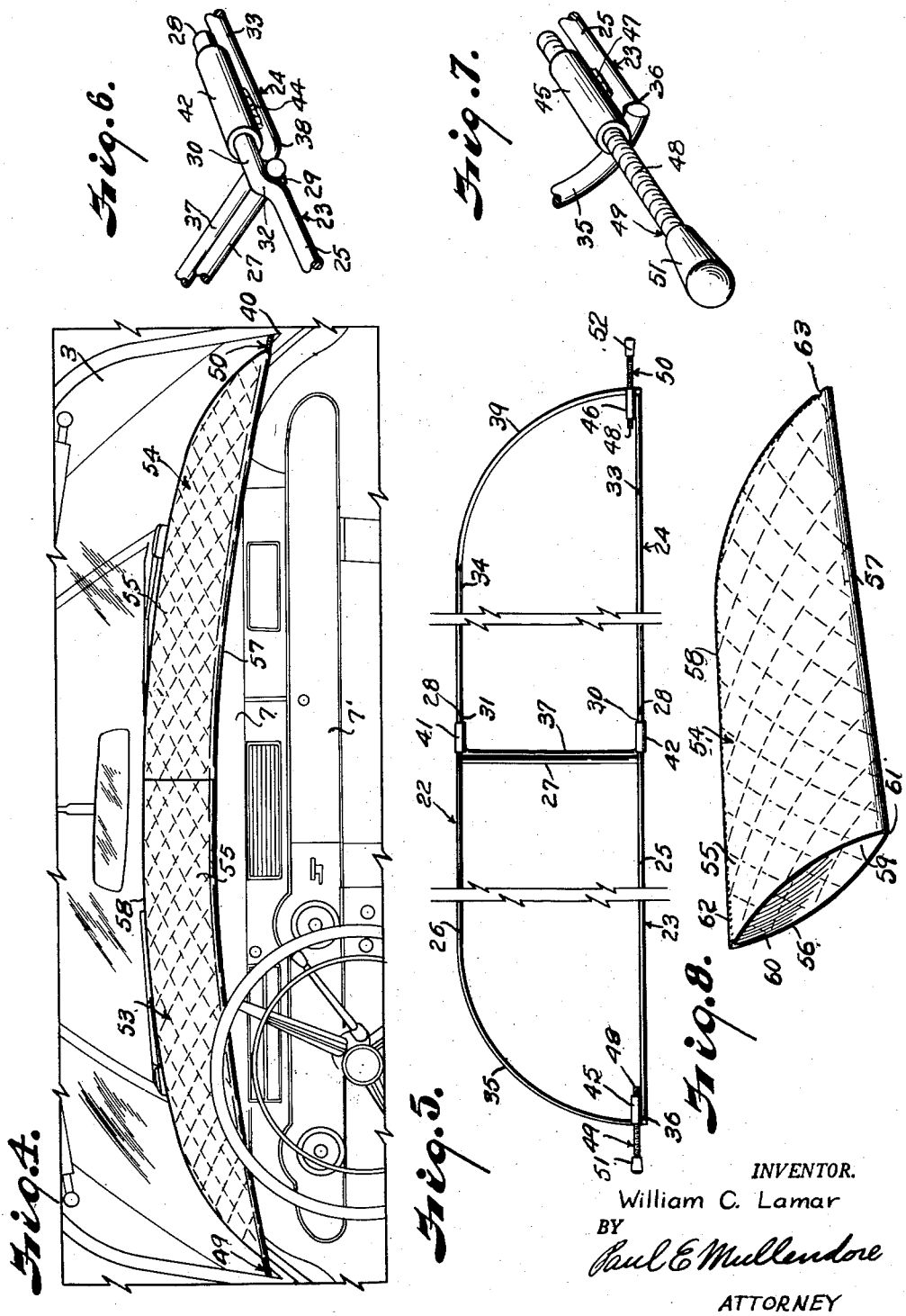

United States Patent Office 3,042,445
Patented July 3, 1962

3,042,445
COMBINATION GLARE SHIELD AND SHADE DEVICE
William C. Lamar, 5941 Holmes St., Kansas City, Mo.
Filed June 30, 1960, Ser. No. 40,099
6 Claims. (Cl. 296—97)

This invention relates to a combination glare shield and shade device for protecting occupants of the front seat of a motor vehicle from objectionable rays of light that pass through the windshield.

For example, motor vehicles as presently manufactured are equipped with wraparound windshields having large glass areas that slope or curve downwardly and forwardly from the top over relatively wide cowls, and the sides of the glass curve from the front to points at the sides of the body a considerable distance rearwardly of the portion of the cowl which projects over the instrument panel. Consequently, the cowl is located forwardly of the top and receives the full effects of the sun rays passing through the windshield. The occupants are protected to some extent by small sunshades that are swively mounted under the top to cut off objectionable light rays that pass through the upper portion of the windshield and directly into the eyes of the occupants, but no consideration has been given to the light rays that pass through the lower part of the windshield or those reflected from the cowl. Also, since the sides of the windshield extend beyond the portion of the cowl that projects over the instrument panel, the sun's rays passing through the windshield fall directly upon the legs and laps of the occupants. On hot, sunny days, and particularly when traveling toward the sun, this causes considerable discomfort, even in cases where the cowls are padded and covered with plastic materials, since such materials reflect objectionable rays of light to a substantial degree and under some conditions the image of the cowl appears in the windshield and interferes with the driver's vision.

It is, therefore, a principal object of the present invention to provide a combination glare shield and shade device that extends over the cowl and projects over the instrument panel to include the extended sides of the windshield, to cut off the objectionable light rays and reflections and provide shade for the legs and laps of the front seat occupants.

Other objects of the invention are to provide a combination glare shield and shade device that may include a curved portion corresponding in general curvature with the juncture of the windshield with the forward portion of the cowl to fit therein, and a rear portion that registers transversely with the lower corners of the extended sides of the windshield, and which is adapted to be raised and lowered or arched over the instrument panel to cut off more or less of the direct light rays; to provide a combination glare shield and shade device which is readily conformable to cowls of various contours and adaptable to different widths of windshields; to provide the ends of the device with adjustable bearing portions adapted to contact frictionally the glass of the windshield and on which the angles of the shield may be adjusted; and to provide a construction composed of sections that may be easily disconnected for convenience of handling, storing or the like, and which is easily reassembled for use.

Other objects of the invention are to provide an improved construction for a glare shield and shade device which includes a resiliently formable wire frame adapted to fit different shaped windshields and to provide non-reflecting, relatively soft fabric slips or covering therefor which may flex with the frame when adjusted in use.

In accomplishing these and other objects of the invention, I have provided improved structure, the preferred form of which is illustrated in the accompanying drawings, wherein:

FIG. 1 is a perspective view of the windshield, cowl and instrument panel of a modern motor vehicle equipped with a combination glare shield and shade device embodying the features of the present invention.

FIG. 2 is a transverse section lengthwise of the device, the figure being shortened for convenience of illustration.

FIG. 3 is a fragmentary section through an edge portion of the shield on the line 3—3 of FIG. 1.

FIG. 4 is a perspective view of a modified form of the invention.

FIG. 5 is a plan view of the adjustable frame portion of the glare shield and shade device shown in FIG. 4, without the non-reflecting fabric covering.

FIG. 6 is an enlarged fragmentary perspective view of interconnecting portions of the sections of the frame.

FIG. 7 is an enlarged fragmentary perspective view of one of the adjustable bearings for contacting the glass at the sides of the windshield for supporting the combination glare shield and shade device at a desired angle of inclination.

FIG. 8 is a perspective view of one of the non-reflecting fabric slips used in covering the frame shown in FIG. 5.

Referring more in detail to the drawings, and first to the form of the invention illustrated in FIGS. 1 to 3, inclusive:

1 designates a combination glare shield and shade device embodying the features of the present invention and which is adapted to be installed in a motor vehicle 2 having a windshield 3 of the wraparound type in that the front thereof curves transversely and the ends 4 and 5 curve into the sides 6 of the vehicle. The windshields of modern motor vehicles have a considerable slope and extend over the cowl 7 a considerable distance, so that the shade area in the automobile is greatly reduced, consequently driving against the sun is most uncomfortable. Also, due to the great expanse of the hood, high gloss, and chromium decorations, there are many reflections that are very objectionable and disturbing to the driver. Also, the colors of some cowls are reflected into the glass of the windshield so that vision through the windshield becomes difficult, particularly when the automobile is traveling toward the sun. It is true that the top portions of such windshields are often tinted, but the tinted portions give little protection to the legs and laps of the occupants.

The shield 1 is to eliminate these objections and is of a size to cover the major portion of the cowl 7. The front edge 8 of the shield is preferably shaped according to the transverse curvature of the windshield so that it may fit at times closely into the juncture of the windshield and cowl. The depth of the shield is preferably greater than the depth of the cowl, so that the rear edge 9 may project rearwardly of the cowl to shade the laps and legs of the occupants of the front seat. The length of the shield 1 is such that the ends 10 and 11 thereof are positioned slightly short of the curved ends 4 and 5 of the windshield to accommodate supporting brackets 12 and 13, later to be described. The shield 1 is preferably formed of a non-reflecting material that is sufficiently stiff to be self supporting. An example of one material is a light weight, relatively thin composition board, such as "Masonite." "Masonite" has a relatively non-reflecting surface, but if desired the surfaces thereof may be treated to render them even more absorbent of light rays. "Masonite" is also a material that will not scratch or mar the parts of the cowl or injure the glass of the windshield. It also has sufficient flexibility that it may be arched to conform to curvature of the cowl or to increase the support thereof transversely of the windshield.

The brackets 12 and 13 are of like construction and each includes a channel shaped clip 14 to provide flanges 15 and 16 adapted to grip the ends of the shield therebetween, with the edges of the shield bearing against the connection portions 17 of the clips. Extending outwardly of the portions 17 are internally threaded sockets 18 for connecting externally threaded stems 19. The stems 19 carry resilient tips 20 having flat face portions 21 for engaging the ends 4 of the windshield.

The edges of the shield 1 may be suitably finished so as to avoid sharpness, and corners may be rounded. The edges may be covered by a resilient binding 22' as shown in FIG. 2, although it is sufficient to cover only the rear edge of the shield as shown in FIG. 1.

The form of the invention shown in FIGS. 4 to 8, inclusive, includes a frame 22 (FIG. 5) which for convenience in handling is preferably constructed in sections 23 and 24. The sections 23 and 24 are illustrated as being removably connected together, although they may be permanently connected in the broad aspects of the invention. The frame 22 is composed of resilient wire material, so that the frame may better conform to the shape and contour of the cowl on which the device is used. The frame material, however, should impart sufficient spring action in the frame to retain position and adjustment thereof when in use in a vehicle, and to resume its normal shape when removed.

The section 23 may be formed of wire to include a substantially linear rear transverse portion 25 constituting in length slightly more than one-half the total length of the rear portion of the frame, and a forward portion 26 (FIG. 5) spaced therefrom in accordance with the desired width of the device by a longitudinal stay 27. In the illustrated instance, the stay 27 is inset from the ends 28 of the transverse portions 25 and 26 and is secured thereto, for example, by welds 29, to leave projecting terminals 30 and 31. The terminals 30 and 31 are preferably offset at the point of attachment of the stay 27, as indicated at 32 (FIG. 6), whereby the transverse portions 25 and 26 may substantially register with corresponding transverse portions 33 and 34 of the section 24, as best shown in FIGS. 5 and 6. The outer end of the transverse portion 26 curves as indicated at 35 (FIG. 5) in accordance with the general curvature of the side portions of a windshield, and joins with the outer end of the transverse portion 25 as by welding 36, as best shown in FIG. 7.

In the illustrated instance, the portions 33 and 34 of the section 24 and a longitudinal stay 37 thereof are formed as a single wire provided with bends 38 (FIG. 6). The opposite outer end of the transverse portion 24 curves as indicated at 39, to be joined with the outer end of the transverse portion 33 by welding. The lengths of the stays 27 and 37 are such as to extend from the median juncture of the cowl 7 with the windshield 3 and to project the desired distance beyond the connection of the cowl with the instrument panel 7', preferably in registry with the lower corners 40 of the wraparound windshield, as shown in FIG. 4.

In order to connect the sections together, the portions 33 and 34 of the section 24 carry sleeves 42 and 41 that are suitably attached thereto, for example, by welding 44, to slidably receive therein the terminals 30 and 31 of the section 23, whereby the sections are connected together as shown in FIG. 5. The outer ends of the transverse portions 25 and 33 of the sections 23 and 24 have similar sleeves 45 and 46 that are fixed thereto, as by welding 47, as best shown in FIG. 7. The sleeves 45 and 46 are internally threaded and adjustably retain externally threaded stems 48 of supports 49 and 50, whereby the rear transverse portion of the frame is supported within the lower rear corners 40 of the windshield 3. Rubber tips 51 and 52 are preferably provided on the outer ends of the threaded stems 48 to provide a cushion or soft contact with the glass of the windshield.

When the frame is composed of disconnectable sections, as shown in the drawings, the frame is preferably covered with slips 53 and 54. The slips are of identical construction, and one of them is best illustrated in FIG. 8. As shown in FIG. 8, a slip has upper and lower sides 55 and 56 conforming in contour with the section of the frame on which it is mounted. The sides 57 and 58 are suitably connected along the edges thereof to provide a pocket 59, open at the end 60, for example, one of the edges might be a fold 61, and the opposite edges suitably connected, for example, by stitching them together, as indicated at 62. The outer ends of the sides of a slip are curved in accordance with the curvature of the wire at the end of the frame, and the rear corner thereof is provided with an opening 63 adjacent the termination of the fold 61 to pass the threaded stems 48 therethrough when the slips are mounted on the sections of the frame.

Assuming that the parts of the modified form are constructed as described, the sections are readily interconnected by passing the terminals 30 and 31 of the section 23 into the sleeves 42 and 41 of the section 24 until the longitudinal stays 27 and 37 of the respective sections abut each other, as shown in FIG. 6. The supports 49 and 50 are applied to the respective sections by turning the threaded shanks 48 thereof into the sleeves 45 and 46. The slip cover 54 is then slipped over the outer end of the section 24, with the threaded support 50 passing through the opening 63. With both sides of each slip made of the same material, the slips may be alike and the rights and lefts are attained merely by turning over one of the slips. The other slip 53 may then be applied to the section 23, so that the open ends of the slips 53 and 54 come together for connection by suitable means, if necessary, such as snaps, ties, or other suitable means. However, in most instances the slips may simply be drawn together, since there is sufficient spring action in the frame to frictionally retain the covering in taut condition without slipping on the frame.

In using the preferred form of the invention, the clips 14 are adjusted on the ends of the shield 1 so that the face portions 21 of the resilient tips 20 are in position to engage the end portions 4 and 5 of the windshield. The device is then placed over the cowl and the shanks 19 are adjusted in the sockets 18 to exert a holding pressure on the ends of the windshield to support the device at the desired elevation and to impart the desired curvature therein. In this form of the invention, the combination shade and shield may be adjusted to any desired angle, that is, the shield may be tilted forwardly and downwardly as shown in FIG. 1, or it may be tilted in a reverse direction so that the forward end is uppermost. The shield may also be adjusted to and from the windshield by sliding the ends thereof within the clips 14, if there is not sufficient room to slide the resilient tips on the curved ends of the windshield.

In mounting the modified form of the invention in a vehicle over the cowl 7, the forward edge portion of the device is pushed within the juncture of the windshield 3 with the cowl 7 and the supports 49 and 50, so that the tips thereon engage the glass of the windshield in the lower corners 40 thereof, with sufficient pressure to arch the rear portion of the device over the cowl to supply the tension for securely retaining the device in an adjusted position and the forward transverse edge in contact with the windshield or frame thereof. When in position, the material of which the covering is formed absorbs the light rays and eliminates reflection onto the occupants of the front seat of the vehicle. The rearward projection of the device over the instrument panel 7' cuts off light rays and shades the legs and laps of the occupants. If sufficient shade is not provided, the shade area may be increased by raising the contact points of the tips 51 and 52 on the glass of the windshield. During this adjustment, the forward portion of the device may rock within the juncture of the windshield with the cowl. There is usually sufficient outward pressure exerted by the resilient action of the frames to hold the rear portion of the device in any adjusted position without readjusting the supports 49 and 50. However, if adjustment is required, they may be merely turned within the sleeves 45 and 46 until the tension is attained to effect the desired arching of the device, as needed.

It is obvious that the invention may also be used in the rear window of a vehicle, to shade the backs of the occupants of the rear seat.

From the foregoing, it is obvious that I have provided a combination glare shield and shade device which is of simple construction, easily installed and adjusted in accordance with the comfort of the occupants of the vehicle, and that is readily removed when not needed. When the modified form of device is removed, the sections may be readily disconnected to facilitate storage thereof.

What I claim and desire to secure by Letters Patent is:

1. A combination glare shield and shade device adapted for insertion between the cowl and windshield of a motor vehicle, said device having a forward transverse portion generally conforming to the transverse curvature of the windshield and having a rear portion projecting rearwardly over the cowl, clamps adjustably positionable transversely of ends of the device and having projecting internally threaded sockets, threaded shanks engaging the threads of the sockets, and resilient means on the shanks for engaging the windshield for supporting said device at different angles with respect to the cowl.

2. A combination glare shield and shade device comprising a frame having spaced apart transverse portions and interconnected at ends thereof, internally threaded sleeves fixed to ends of one transverse portion of the frame, supports having externally threaded shanks engaging internal threads of the sleeves and having resilient tips, and a non-reflecting cover on the frame.

3. A combination glare shield and shade device including a frame comprising right and left sections, each section being formed of resilient wire to provide front and rear transverse portions, said front portions having outer ends curving toward and connected with corresponding ends of the rear portions, longitudinal stays connecting inner ends of the front and rear portions, sleeves fixed to inner ends of one of the sections for receiving therein inner ends of the other section to connect said sections together, sleeves fixed to outer ends of the rear transverse portions, supports having shanks adjustable in said last named sleeve, and non-reflecting material separately covering said sections for removal of one section from the other.

4. A combination glare shield and shade device including a frame comprising right and left sections, each section being formed of resilient wire to provide front and rear transverse portions, said front portions having outer ends curving toward and connected with corresponding ends of the rear portions, longitudinal stays connecting inner ends of the front and rear portions, sleeves fixed to inner ends of one of the sections for receiving inner ends of the other section to connect said sections together, sleeves fixed to outer ends of the rear transverse portions, supports having shanks adjustable in said last named sleeve, and slips of non-reflecting material providing open end pockets for containing respectively said sections of the frame and having apertures for passing said supports, said slips joining at the longitudinal stays.

5. A combination glare shield and shade device for support under a transparent panel having ends curving into sides of a motor vehicle body, said device including an elongated sheet-like member having a length less than the space between said curving ends of the transparent panel and of sufficient flexibility to form an arch in the longitudinal direction thereof, support members connected with ends of said sheet-like member and having sockets projecting from said ends and having internal threads, and shanks provided with resilient tips on outer ends thereof and having external threads engaging the internal threads of the sockets, said shanks being turnable in said sockets to bring said resilient tips into bearing frictional contact with the curving sides of the transparent panel to impart said arch while holding the sheet-like member at desired angles of inclination responsive to the arch produced in said sheet-like member.

6. A combination glare shield and shade device as described in claim 5, wherein said support members are movably connected with said ends of the sheet-like member.

References Cited in the file of this patent
UNITED STATES PATENTS

| | | |
|---|---|---|
| 1,627,760 | Wood | May 10, 1927 |
| 2,253,353 | Sharp | Aug. 19, 1941 |
| 2,289,144 | Rossell et al. | July 7, 1942 |
| 2,456,484 | Bell | Dec. 14, 1948 |
| 2,556,950 | Walker | June 12, 1951 |
| 2,558,717 | Davis | July 3, 1951 |
| 2,651,543 | Chonoski et al. | Sept. 8, 1953 |
| 2,711,923 | Parks | June 28, 1955 |